United States Patent [19]
LeBlanc

[11] Patent Number: 4,535,862
[45] Date of Patent: Aug. 20, 1985

[54] ENGINE COOLING SYSTEM FOR VEHICLES

[76] Inventor: James C. LeBlanc, 38261 Long St., Mt. Clemens, Mich.

[21] Appl. No.: 437,851

[22] Filed: Oct. 29, 1982

Related U.S. Application Data

[60] Continuation-in-part of Ser. No. 287,042, Jul. 27, 1981, abandoned, which is a continuation of Ser. No. 145,604, May 1, 1980, abandoned, which is a division of Ser. No. 927,600, Jul. 21, 1978, abandoned.

[51] Int. Cl.³ ............................................. B60L 11/00
[52] U.S. Cl. ................................ 180/68.1; 89/36.08; 123/41.7; 180/68.4
[58] Field of Search .................... 180/68.1, 68.2, 68.6, 180/68.4; 89/36 H, 40 B; 98/2.11; 123/41.7, 195 C, 198 E; 165/166

[56] References Cited

U.S. PATENT DOCUMENTS

| | | | |
|---|---|---|---|
| 3,630,003 | 12/1971 | Ashton | 180/89.17 X |
| 3,786,891 | 1/1974 | Vogelaar et al. | 180/68.1 |
| 4,242,951 | 1/1981 | Bemiss | 98/2.11 |
| 4,341,277 | 7/1982 | Adamson et al. | 180/68.1 |

FOREIGN PATENT DOCUMENTS

| | | | |
|---|---|---|---|
| 2757966 | 6/1979 | Fed. Rep. of Germany | 180/68.1 |
| 405114 | 7/1966 | Switzerland | 89/36 H |
| 424504 | 5/1967 | Switzerland | 89/36 H |
| 457156 | 12/1936 | United Kingdom | 89/40 B |
| 1402633 | 8/1975 | United Kingdom | 180/68.1 |

Primary Examiner—Robert J. Spar
Assistant Examiner—Donald W. Underwood
Attorney, Agent, or Firm—Lalos, Leeds, Keegan, Marsh, Bentzen & Kaye

[57] ABSTRACT

A cooling system for a vehicle's engine including a plenum chamber disposed in the vehicle's body, an exhaust system, and a radiator disposed between an interior portion of the body including the engine and the plenum chamber and operatively connected to the engine. A fan is mounted in the plenum chamber between the radiator and the exhaust system and adjacent the radiator and, when operated, air within the interior portion of the body including the engine is drawn through the radiator and the plenum chamber and expelled through the exhaust system. A cover member is removably mounted on the body generally over the engine for providing access to the engine from outside the body. An air inlet system associated with the cover member provides air from outside the body to the radiator. A plate attached to cover member directs air provided by the inlet system to the radiator in a manner such that the incoming ambient air does not scrub over the heated engine or the transmission.

35 Claims, 15 Drawing Figures

ENGINE COOLING SYSTEM FOR VEHICLES

The present application is a continuation in part of copending Application Ser. No. 287,042, filed July 27, 1981, now abandoned, which is a continuation of Application Ser. No. 145,604, filed May 1, 1980, now abandoned, which is a division of Application Ser. No. 927,600, filed July 21, 1978, now abandoned.

The present invention relates to a cooling system for a vehicle and particularly to a cooling system for a vehicle suitable for use for military and para-military purposes and for both land and amphibious operations. The invention further contemplates a novel hood arrangement for the cooling system positioned over the engine and when raised providing access to the engine.

In the prior art, there have been developed and used cooling systems for military and para-military vehicles which have not performed completely satisfactory. One of the problems that has developed is that the air entering through the air inlet systems of the vehicle has scrubbed over the heated engine and transmission before entering the radiator. Although this has had the beneficial effect of cooling, to a limited extent, the exterior of the engine and transmission, it has heated the air to such an extent that the cooling fluid is not cooled sufficiently by the incoming air passing through the radiator and thus the internal working components of the engine transmission were not cooled sufficiently.

Further problems have arisen relative to the prior art cooling systems. In particular, the exhaust outlet for the heated air when positioned adjacent the air inlet has caused the heated exhaust air to mix with the cooler inlet ambient air thereby heating the inlet air and reducing the efficiency of the cooling system. Further, some of the past designs have not provided a sufficient amount of cooler ambiet air to enter through the air inlet means.

Also, some of the prior designs have not provided a convenient method for providing access to the engine and/or transmission from the outside of the vehicle. Such access allows personnel to easily and readily repair or replace the engine and/or the transmission without having to remove the panels of the body. Thus, in many past designs it has been very difficult if not impossible to effect field repair or replacement of the engine due to the additional equipment required or the lengthy time involved.

Accordingly, it is the principal object of the present invention to provide an improved cooling system for a vehicle suitable for military and para-military purposes and for land and amphibious operations.

Another object of the present invention is to provide an improved cooling system for a vehicle including easy access to the engine and transmission from outside of the vehicle.

A further object of the present invention is to provide a novel cooling system having an air inlet means wherein the air does not scrub over the hot transmission and engine before entering the radiator.

A still further object of the present invention is to provide a novel cooling system in which the heated exhaust air does not mix with the cooler ambient air before entering the vehicle.

Another object of the present invention is to provide a novel cooling system having an air inlet means that provides a sufficient quantity of cooler ambient air to the radiator.

A further object of the present invention is to provide a novel cooling system which is simple in design, comparatively inexpensive to manufacture and more adaptable to maintenance and servicing.

Other objects and advantages of the present invention will become more apparent to those persons having ordinary skill in the art from the following description taken in conjunction with the accompanying drawings, wherein:

Referring to the drawings, there is illustrated an embodiment of the invention. Generally, the embodiment includes a hull 20, a weapons system 21 mounted on the hull, front and rear axle assemblies 22 and 23 provided with wheels 24 and 25 and wheels 26 and 27, respectively, and brake systems, front and rear suspension systems 28 and 29, an engine 30, a transmission 31, a drive line 32, a cooling system 33, a driver's station 34, a steering system 35 and various engine, transmission and drive control systems and additional auxiliary systems.

Figure 1:
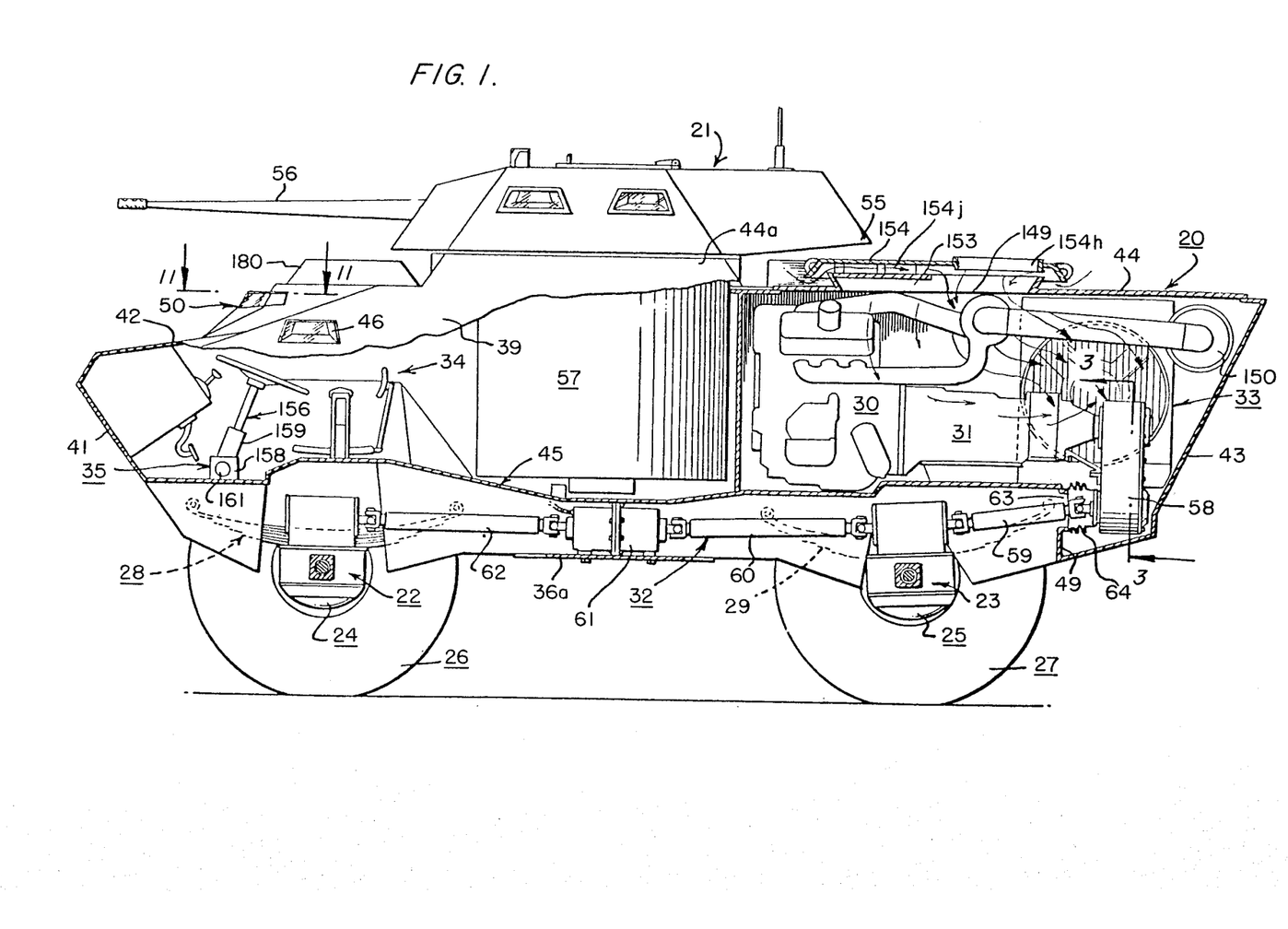
FIG. 1 is a side elevational view of an embodiment of the invention having portions thereof broken away to provide a view of the interior.
Figure 2:
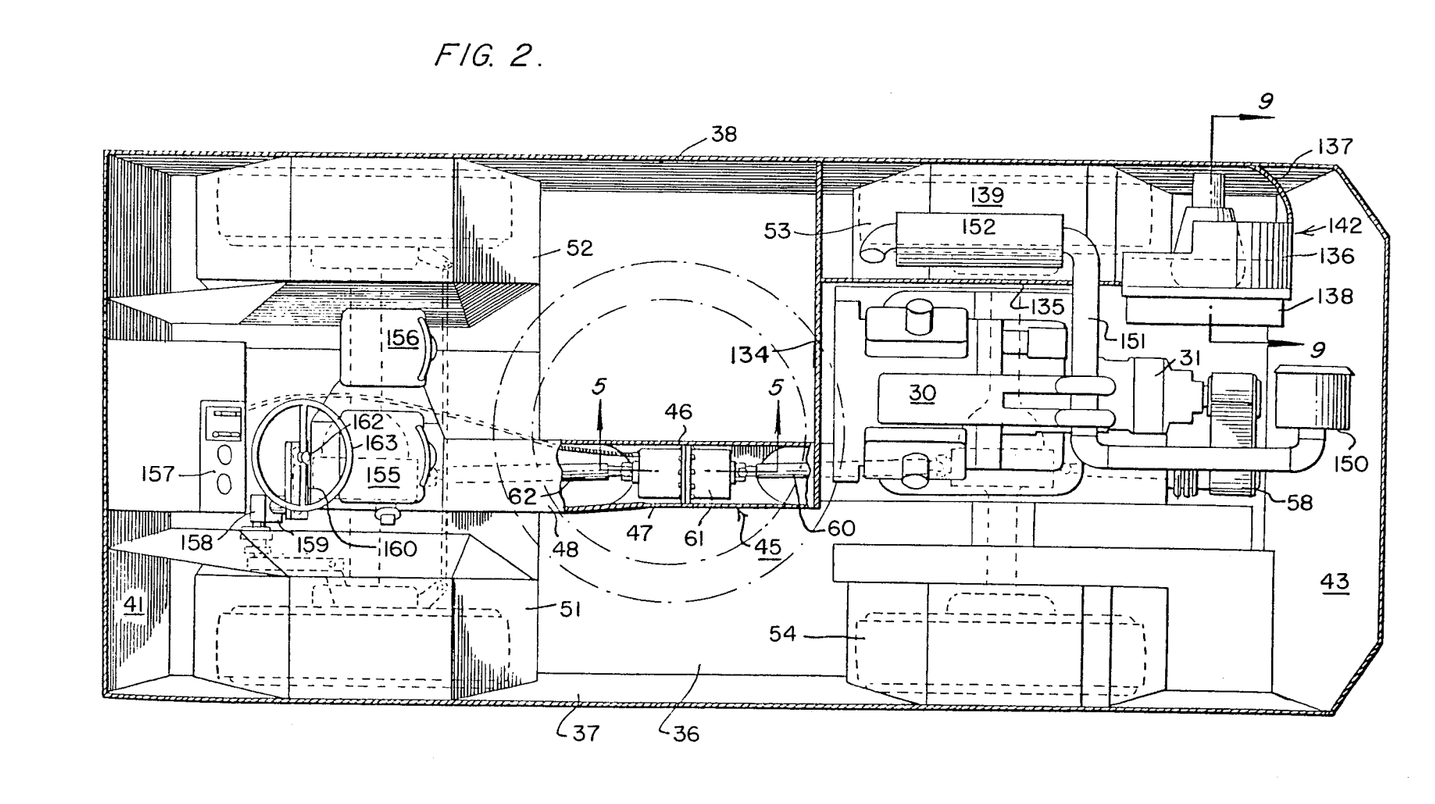
FIG. 2 is a horizontal sectional view of the embodiment shown in FIG. 1.
Figure 8:
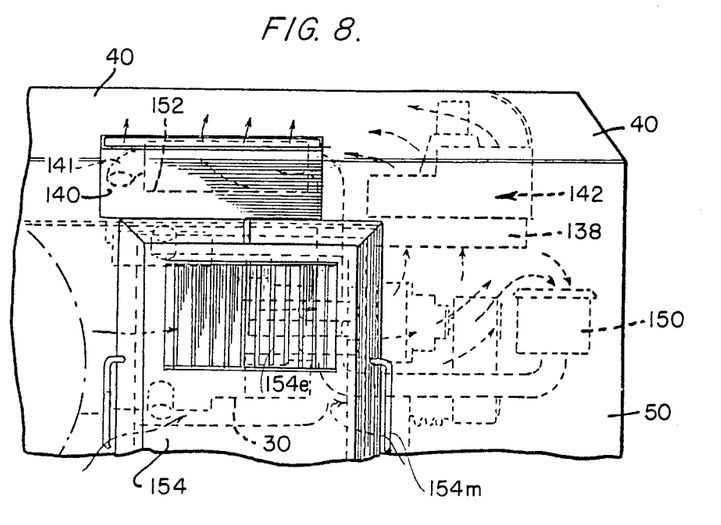
FIG. 8 is a fragmentary top plan view of the embodiment illustrated in FIGS. 1 through 7.

As best illustrated in FIGS. 1 and 2, the hull is of a monocoque or unitized construction, formed of armor or abrasion resistant steel panels, welded together. Generally, the hull includes a bottom or floor section 36, lower side wall sections 37 and 38, upper side wall sections 39 and 40 (FIGS. 8 and 9), a lower front wall section 41, an upper front wall or hood section 42, a rear wall section 43 and a top or roof section 44. Mounted on floor section 36 is a drive line housing 45, offset slightly from the longitudinal center line of the vehicle, which includes a pair of side walls 46 and 47, a top wall 48 and a rear end wall 49. As best shown in FIG. 1, the lower portions of the forward and rear ends of the drive line housing are open to accommodate the axle assemblies.

Lower side wall sectons 37 and 38 are welded adjacent their lower edges to floor section 36 and project outwardly and upwardly at an angle to the floor section. Similarly, lower front wall section 41 and rear wall section 43 are welded adjacent their lower edges to floor section 36 and project upwardly and outwardly at angles to the floor section. The side edges of lower front all section 41 and rear end wall section 43 also are welded to lower side sections 37 and 38. Upper side wall sections 39 and 40 are welded along their lower edges to the upper edges of lower side wall section 37 and 38 and project inwardly and upwardly at an angle to the lower side wall sections. The rear edges of the upper side wall sections also are welded to the upper side edges of rear end wall section 43.

The front end of the hull is closed by the upper front wall or hood section 42 which includes a vision block arrangement 50. The front and side edges of the hood section are welded to the lower front end section 41 and also to the side wall sections of the vehicle. The upper end or roof section 44 is substantially flat or horizontal and is provided with a forwardly-disposed raised portion 44a on which the weapon system is mounted. Otherwise, the roof section is welded about its periphery to the upper edges of upper side wall sections 39 and 40, hood section 42 and rear end wall section 43.

It will be noted that the lower side wall sections of the hull are formed at an angle relative to the floor section, and the upper side wall sections of the hull are formed at angles relative to the lower side wall sections, in the conventional manner, for the purpose of deflecting small arms fire. The side wall sections also are provided with access doors disposed adjacent the weapon station amidship, a number of vision blocks 46 to permit occupants of the vehicle to view the exterior and a number of ports through which small arms may be inserted for firing. Rear end wall 43 also is provided with an access door on the left-hand side thereof having a vision block to permit visibility to the rear.

It will be seen that the hull is formed integrally from a plurality of panels to provide ballistic protection to the occupants of the vehicle and also to permit flotation of the hull. All doors and hatches on the hull are provided with suitable seals to prevent leakage of water into the hull during amphibious operations. It further will be noted that lower front end section 41 and rear end section 43 are raked for the purpose of facilitating the entry and departure of the vehicle into and out of a body of water. The steep angles of the front and rear ends of the hull permit maximum angles of water entry and departure of the vehicle.

As best shown in FIG. 2, portions of the floor section and adjacent portions of the lower wall sections are cut away and provided with housing assemblies 51 through 54, defining front and rear wells for accommodating the wheels of the vehicle. The wheel well housings also are formed of panels of armor steel welded together and are integral parts of the vehicle hull.

Weapon system 21 basically consists of a turret 55, a weapon 56 mounted on the turret and a support structure or platform 57 secured to the turret and depending therefrom into the hull of the vehicle. Turret 55 is supported on a large diameter bearing mounted on raised roof portion 44a of the hull about an opening therein. Support platform 57 is bolted or otherwise rigidly secured to the turret and is adapted to rotate with the turret. A drive mechanism with suitable controls is provided in the turret which cooperate with a ring gear mounted on the hull for training the turret and depending support platform.

Weapon 56 is mounted on a front end of the turret and is provided with a mechanism for elevating and lowering the weapon, a mechanism for feeding ammunition to the weapon and suitable instruments and mechanisms for aiming and firing the weapon. Also provided in the turret are means for storing ammunition.

Turret 55 also is formed of armor or abrasion resistant steel panels welded together. Such panels are disposed at angles relative to each other, again, for the purpose of deflecting small arms fire. The turret is provided with hatches on the upper end thereof to permit access to the turret and hull, and vision blocks to permit the weapon operator to view the exterior of the vehicle. In operating the weapon, the operator may either stand on the support platform or be seated on a seat mounted on the upper end thereof. It will be noted that in either instance the operator would be rotated with the turret and depending support platform. Controls for training the turret and elevating and lowering the weapon are provided in the turret easily accessible to the operator.

While the embodiment of the invention illustrated in the drawings includes a rotatable turret provided with a conventional form of weapon, it is understood that other types of stations may be provided in lieu thereof. The vehicle may merely have an elevated and closed top without any weapon system which would permit the vehicle to be used as a command vehicle, a personnel carrier, a cargo carrier or a rescue unit. Also, in lieu of of a turret provided with a conventional weapon, the vehicle may be provided with a missile system or other forms of conventional weapons including a mortar and the like.

Axle assemblies 22 and 23 are conventional, hypoid, single-speed, double-reduction type assemblies of the type used extensively by the U.S. military and manufactured and sold by Rockwell International Corporation of Troy, Mich., USA. Such assemblies are of the "top drive" type utilizing locking or no spin differentials. The brake systems mounted on the axles are of the internal expanding type provided with hydraulic power boosters. The wheels mounted on the axles are of a conventional type having disc and rim components. The tires are of a "run flat" type, i.e., having reinforced side walls to permit limited running when the tires have been punctured, are of a type manufactured and sold by the Mansfield Tire and Rubber Company of Mansfield, Ohio, USA. Such tires further are provided with deep recesses in the treads thereof which are effective to propel the vehicle at low speeds when the vehicle hull is afloat and the wheels are spinning. The upper ends of the wheels are received within wheel well housings 51 through 54, as best illustrated in FIG. 2.

The suspension systems are of a conventional, trunk type design generally including heavy-duty leaf springs operatively connected to the underside of the hull by pins and shackles and supported on the axle housings, U-bolts and retainer plates for securing the springs to the axle housings and conventional shock absorbers operatively interconnecting the hull and the axle housings. As shown in FIG. 1, the axle and suspension assemblies are mounted on the exterior of the hull.

Engine 30 may consist of either a diesel or gas engine. Preferably, however, the engine should be two-cycle, V-6 turbocharged diesel engine provided with a fuel injection system of a type manufactured and sold by the General Motors Corporation of Detroit, Mich., USA.

As best illustrated in FIGS. 1 and 2, the engine is mounted within the hull between the axle assemblies, just forward of the rear axle and to the right of the longitudinal center line of the hull adjacent the right side wall of the hull. Mounted on the hull directly behind the engine is transmission 31. It will be noted that the transmission overhangs the rear axle. Preferably, the transmission is an automatic, five-speed transmission, of a type manufactured and sold by General Motors Corporation of Detroit, Mich., USA. The roof section of the hull is provided with a suitable access hatch to permit the installation and removal of the engine and transmission, and servicing of such components.

Drive line 32 which transmits torque from the transmission to the differentials of the axles includes a drive chain assembly 58, a rearwardly disposed propeller shaft 59, an intermediate propeller shaft 60, a disconnect clutch 61 and a forwardly disposed propeller shaft 62. Drive chain assembly 58 is mounted on the transmission housing and functions to transmit drive from the transmission output shaft downwardly and toward the longitudinal center line of the vehicle. Rearwardly disposed propeller shaft 59 is operatively connected at opposite ends with universal joints to the lower end of the chain drive assembly and rear axle assembly 23, and functions to transit drive from the lower end of the drive chain assembly to the rear axle. Intermediate propeller shaft 60 is operatively connected at opposite ends thereof through universal joints to rear axle assembly 23 and disconnect clutch 61, and functions to transmit drive from the rear axle to the disconnect clutch. Similarly, forwardly disposed propeller shaft 62 is operatively connected at opposite ends thereof through universal joints to disconnect clutch 61 and axle assembly 22, and functions to transmit drive from the disconnect clutch to front axle assembly 22. Disconnect clutch 61 functions to selectively transmit drive through forwardly disposed propeller shaft 62 to front axle assembly 22 to permit the vehicle to be operated either in a two-wheel or four-wheel mode. Normally, during low speed, off-highway operation, the vehicle is operated in the four-wheel mode, and during high speed, highway operation, the vehicle is operated in the two-wheel mode.

Referring to FIG. 1, it will be seen that chain drive assembly 58 is disposed within the vehicle hull and propeller shafts 59, 60 and 62 and disconnect clutch 61 are disposed on the exterior of the vehicle within drive train housing 45. Disconnect clutch 61 is disposed below the weapon station and is mounted on a floor section 36a of the hull. Rearwardly disposed propeller shaft 59 projects from its connection to the lower end of the chain drive assembly through an opening 63 in the rear end wall 49 of the drive line housing. Water-tight integrity of the hull is maintained in such area by a rubber boot 64 surrounding the universal connection of shaft 59 and the lower end of the chain drive assembly, and secured at opposite ends thereof to annular flanges provided on end wall 49 and the chain drive housing.

Figure 3:
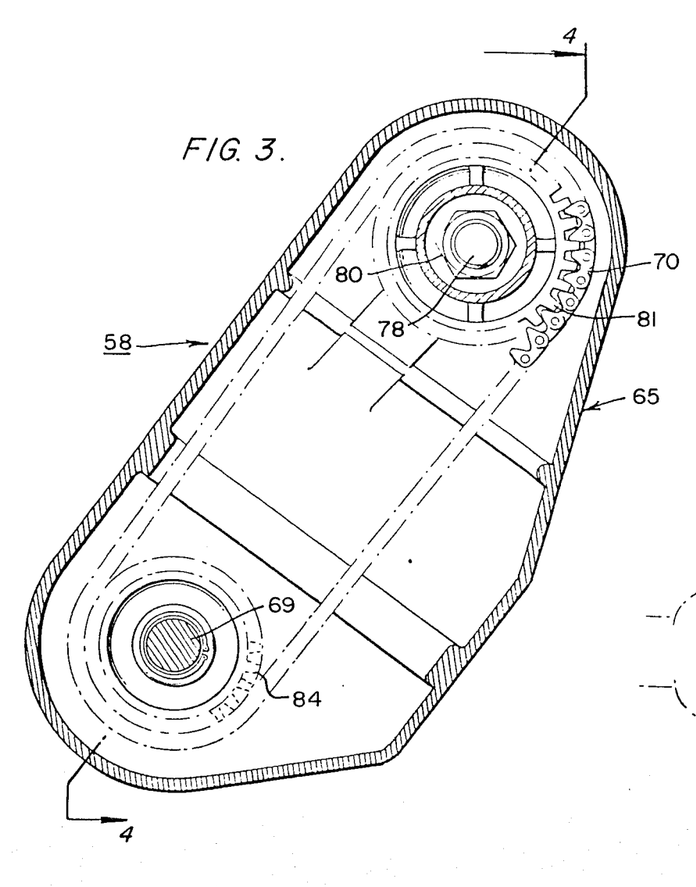
FIG. 3 is an enlarged cross-sectional view taken along line 3—3 in FIG. 1.
Figure 4:
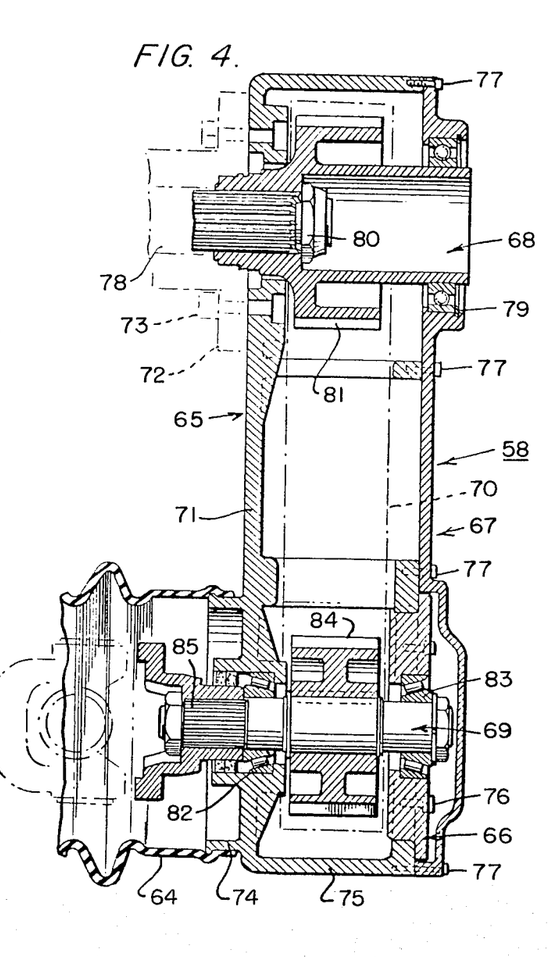
FIG. 4 is a cross-sectional view taken along line 4—4 in FIG. 3.

The chain drive assembly is best illustrated in FIGS. 3 and 4. The assembly includes a housing 65, a lower bearing flange 66, a housing cover 67, an upper sprocket shaft 68, a lower sprocket shaft 69 and a chain 70. Chain housing 65 includes a front wall 71 rigidly secured to a transmission flange 72 be means of a plurality of circumferentially spaced bolts 73, and provided with an annular flange 74 for mounting and securing the rearward end or rubber boot 64, and a peripheral wall 75. Bearing flange 66 is substantially circular in configuration and is secured on rib portions of housing 65 at the lower end thereof by a plurality of circumferentially spaced bolts 76. Housing closure plate 67 is secured to peripheral wall 75 and rib portions of housing 65 by a plurality of bolts 77.

Sprocket shaft 68 is supported at its front end on a splined portion of transmission output shaft 78 and is journaled at its rearward end in a bearing 79 mounted in a boss at the upper end of housing closure plate 67. Sprocket shaft 68 is rigidly secured to the transmission output shaft by means of a nut 80 threaded down on a threaded end portion of the transmission output shaft. Shaft 68 further is provided with a sprocket portion 81 disposed between housing wall 71 and housing closure plate 67. Lower sprocket shaft 69 is journaled in a set of bearings 82 mounted in a boss at the lower end of housing wall 71 and 83 mounted in bearing flange 66. A sprocket 84 is mounted on the intermediate portion of shaft 69 in alignment with socket portion 81 to receive sprocket chain 70. The forward end of sprocket shaft 69 is splined as at 85 on which there is mounted a yoke connected to rearwardly disposed propeller shaft 59 through a universal connection. Sprocket shaft 69 is provided with threaded end portions on which nuts may be threaded and torqued to suitably preload bearings 82 and 83.

Figure 5:
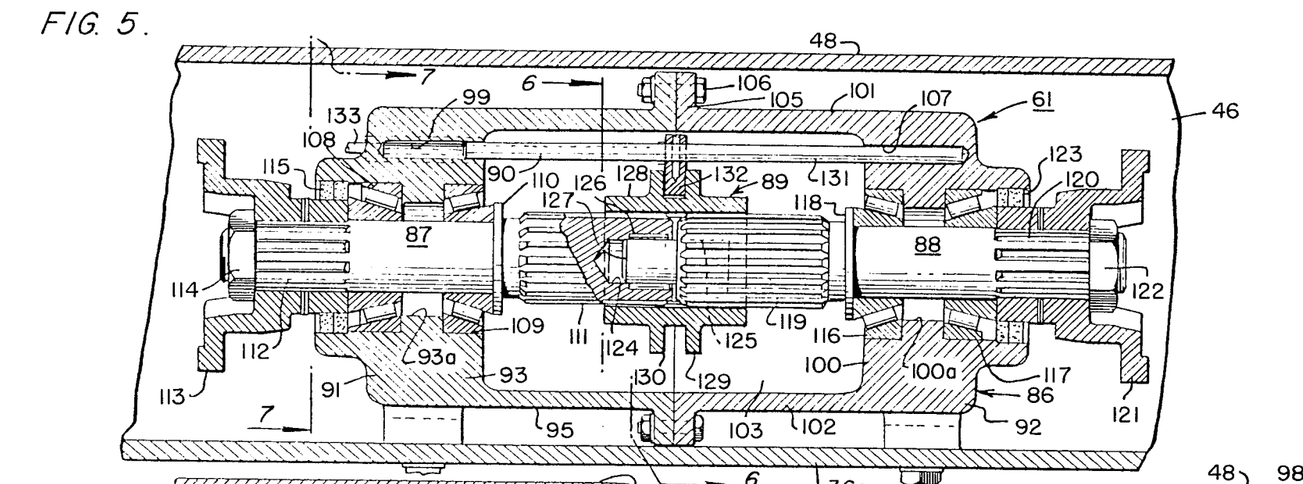
FIG. 5 is an enlarged cross-sectional view taken along line 5—5 in FIG. 2.
Figure 6:
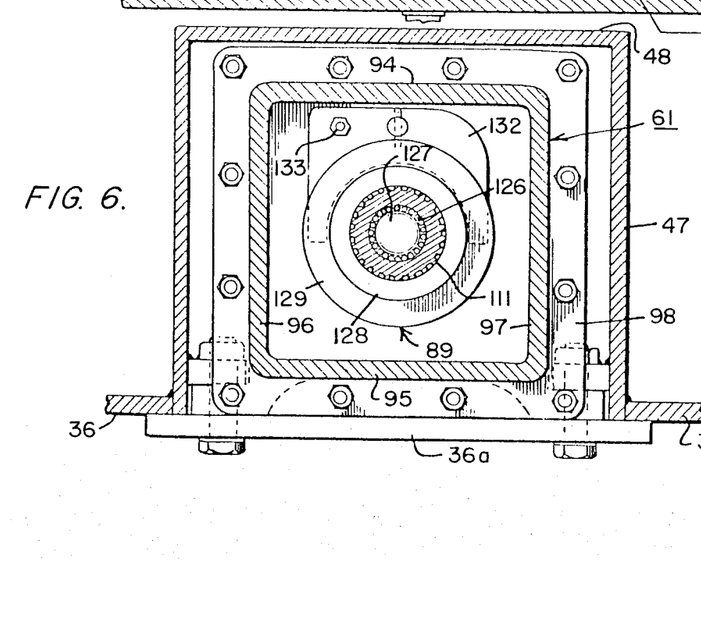
FIG. 6 is a cross-sectional view taken along line 6—6 in FIG. 5.
Figure 7:
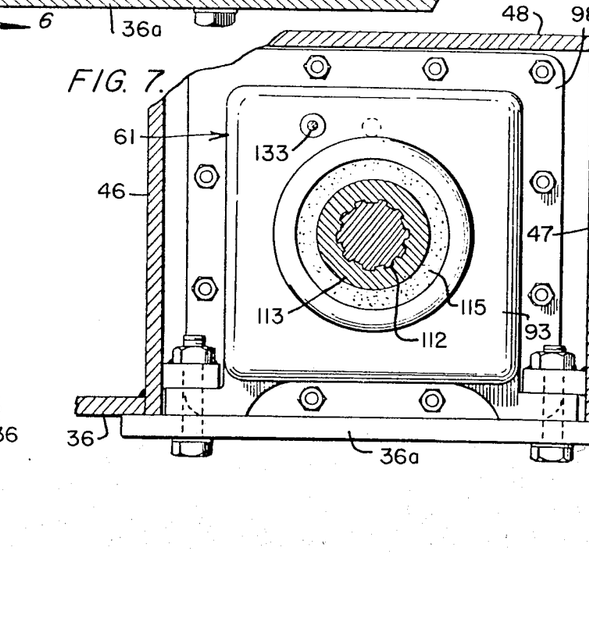
FIG. 7 is a cross-sectional view taken along line 7—7 in FIG. 5.

Disconnect clutch 61 is best illustrated in FIGS. 5 through 7. It consists of a housing 86, a pair of coaxially disposed shafts 87 and 88 journaled in the housing, a coupling collar 89 and an actuating device 90. Clutch housing 86 consists of two sections 91 and 92 secured together and bolted to floor section 36a. Housing section 91 consists of an end wall 93 having an opening for receiving shaft 87 therethrough, top and bottom walls 94 and 95, side walls 96 and 97 and a peripheral bolting flange 98. Provided on the inner face of end wall 93 is a bore 99, disposed parallel to shaft opening 93a. Similarly, housing section 92 includes an end wall 100 provided with an opening 100a for receiving shaft 88 therethrough, upper and lower walls 101 and 102, side walls 103 and 104 and a peripheral bolting flange 105 which is adapted to mate with bolt flange 98 of housing section 91 and secured thereto by a plurality of peripherally spaced bolts 106 to form the clutch housing. The inner face of end wall 100 of housing section 92 also is provided with a bore 107 which is disposed parallel to shaft opening 100a and is adapted to be aligned longitudinally with bore 99 in the end wall of housing section 91 when sections 91 and 92 are bolted together to form the clutch housing.

Shaft opening 93a is provided with enlarged bore sections in which there are mounted bearings 108 and 109. Shaft 87 is provided with an intermediate portion journaled in bearings 108 and 109, a collar portion 110 abutting the inner race of bearing 109, a splined inner end portion 111 and a splined outer end portion 112. A yoke 113 provided with internal splines is mounted on splined portion 112 of shaft 87, the inner end of which is adaped to engage the inner race of bearing 108. A nut 114 is threaded onto a threaded end portion of shaft 87 to retain the yoke on the shaft and may be torqued to preload bearings 108 and 109. Yoke 113 is connected to the universal joint of forwardly disposed shaft 62 for transmitting drive from clutch 87 to propeller shaft 62. Contamination of outer bearing 108 is prevented by sealing rings 115 disposed between an inner end yoke 113 mounted on the outer splined portion of shaft 87 and an annular flange portion of housing end wall 93.

Shaft opening 100a in end wall 100 is disposed coaxially relative to shaft opening 93a of end wall 93 and similarly is provided with enlarged bore sections in which there are mounted bearings 116 and 117. Shaft 88 includes an intermediate portion journaled in bearings 116 and 117, a collar portion 118 engaging the inner race of bearing 116, a splined inner end portion 119, and a splined outer end portion 120. An internally splined yoke 121 is mounted on splined portion 120 of shaft 88, which engages the inner race of bearing 117 at its inner end. A nut 122 is threaded on a threaded end portion of shaft 88 to retain the yoke on the splined portion of the shaft and may be torqued to preload bearings 116 and 117. Yoke 121 is connected to the universal connection of intermediate propeller shaft 59 whereby drive may be transmitted from propeller shaft 59 to clutch shaft 88. Contamination of bearing 117 is prevented by sealing rings 123 disposed between an inner portion of yoke 121 and an annular flange portion of the end wall of housing section 92.

The opposed, inner faces of shafts 87 and 88 are provided with coaxially aligned bores 124 and 125 which are provided with needle bearings 126. Disposed within bores 124 and 125 and journaled in needle bearings 126 is an aligning pin 127.

Coupling collar 89 consists of an internally splined cylindrical portion 128 mounted on at least one of splined shaft portions 111 and 119 and displaceable axially to span the inner ends of shafts 87 and 88 and engage the splines of the shafts, and an annular flage 129 provided with an annular groove 130. Actuating device 90 consists of a rod 131 disposed in longitudinally aligned bores 99 and 107 in the housing sections, provided with a depending, C-shaped shifting element 132 which is received in the upper portion of annular slot 130 of coupling collar 89. A control cable 133 extends through a suitable opening in the end wall of housing section 91 and is connected to the shifting element. The opposite end of the cable is connected to a control lever located at the driver's station which may be operated to displace actuating rod 131 along its length. It will be appreciated that upon operation of such control lever, actuating rod 131 and shifting element 132 will be displaced longitudinally to correspondingly displace coupling shaft 89 longitudinally. Longitudinal displacement of coupling collar 89 will cause shafts 87 and 88 to become engaged and disengaged and thus engage and disengage the front axle from the drive line of the vehicle to provide two or four wheel drive modes of the vehicle.

When it is desired to operate the vehicle in four wheel drive, the clutch control lever is operated to displace coupling collar 89 so that it engages splined portions 111 and 119 to couple shafts 87 and 88 together. Under such conditions, drive is transmitted from transmission output shaft 87 and spocket shaft 68 through drive chain 70, sprocket shaft 69, rearwardly disposed propeller shaft 59 to rear axle assembly 23, intermediate propeller shaft 60, clutch shaft 88, coupling collar 98, clutch shaft 87 and forwardly disposed propeller shaft 62 to front axle assembly 22. To convert from four-wheel drive to two-wheel drive, the clutch control lever is operated to shift coupling collar 89 out of engagement with one of splined portions 111 and 119 to disengage the front axle assembly.

Figure 9:
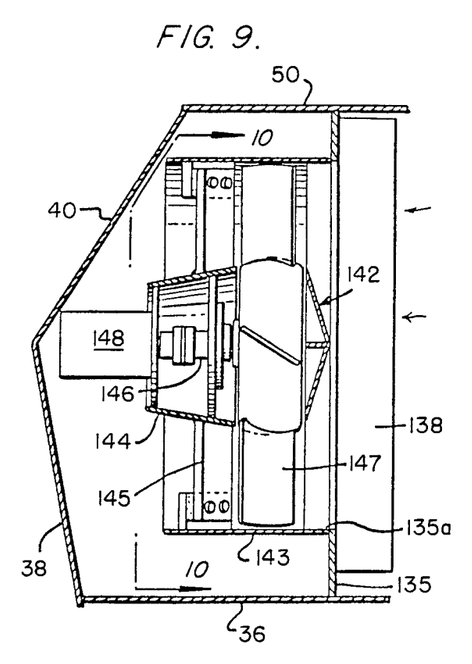
FIG. 9 is an enlarged cross-sectional view taken along line 9—9 in FIG. 2.

Referring to FIG. 2, the interior of the vehicle hull is provided with a transversely disposed partition wall 134 disposed immediately forwardly of the engine. Extending rearwardly from partition wall 134, along the engine, is a partition wall 135 which extends almost to the rear of the vehicle. Extending laterally from the rear end of partition wall 135 is a partition wall 136 having a forwardly curved portion 137 engaging the side wall of the hull. A radiator 138 of the cooling system for the vehicle is mounted on the hull across an opening in partition wall 135. As best seen in FIGS. 2 and 9, interior partition walls 134, 135 and 136, the floor, wheel well housing 53, side wall and roof sections of the hull and radiator 138 form a plenum chamber 139 disposed substantially between the engine and a side wall of the hull. The forward end of the plenum chamber communicates with the exterior of the vehicle through an exhaust opening 140 in the roof section of the hull. Gases expelled through exhaust opening 140 are diverted upwardly and laterally by a baffle 141 mounted on the roof section of the hull. Radiator 138 is of a conventional construction and is connected to the coolant circulating system of the engine in the conventional manner. Mounted at the rear end of partition wall 135 adjacent radiator 138 for drawing air from the interior of the hull including the engine and the radiator, and expelling such air through plenum chamber 139, exhaust opening 140 and baffle 141 into the atmosphere is a fan assembly 142.

Figure 10:
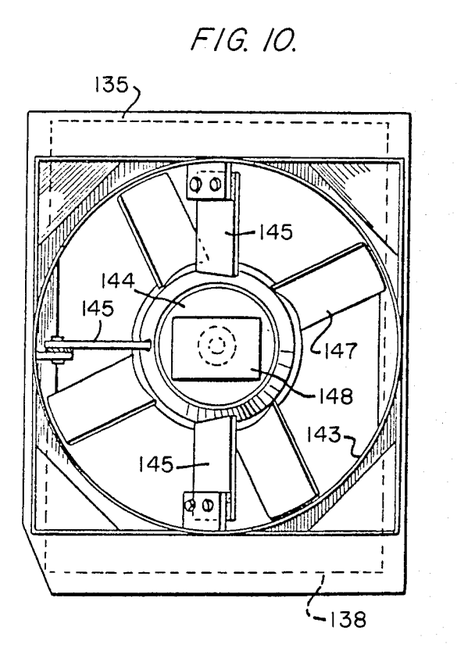
FIG. 10 is a cross-sectional view taken along line 10—10 in FIG. 9.

The fan assembly is best illustrated in FIGS. 9 and 10 and consists of a shroud 143 mounted on the rear end of partition wall 135 about opening 135a, a housing 144 mounted coaxially relative to shroud 143 and supported therein by several radially disposed struts 145, an impeller shaft 146 journaled in housing 144, an impeller 147 mounted on the front end of shaft 146 adjacent opening 135a, and a fluid motor 148 mounted on the outer end of housing 144 and operatively connected to impeller shaft 146. Fluid motor 148 is operated by a pump driven by an auxiliary system on the engine.

An advantage of the cooling system as described is that the engine need not be located in a closed compartment as in vehicles in the prior art utilizing conventional cooling systems. Air is drawn by the fan assembly from the interior of the entire vehicle, thus providing a certain amount of ventilation and removing smoke and other noxious gases which results in greater comfort to operating personnel. Air also is drawn from the exterior of the hull through an inlet opening 149 provided in roof section 44, above the engine. A portion of such air is drawn through an air inlet member 150 of the turbocharger assembly of the engine. Air expelled by the fan assembly through plenum chamber 139 also passes in heat exchange contact with an exhaust pipe 151 and muffler 152 of the engine, located in the front end of plenum chamber 139. With such an arrangement, exhaust gases emanating from exhaust pipe 151 will become entrained in the air expelled through the plenum chamber by the fan assembly and expelled into the atmosphere. The entry of foreign matter through inlet opening 149 is prevented by an arrangement of components including an upwardly opening duct 153 mounted on roof section 44 about the periphery of air inlet 149, and a cover member 154 mounted on the roof section and spaced above the upper end of duct 153 to permit air from the atmosphere to be drawn between duct 153 and cover 154 and passed downwardly through inlet 149 into the interior of the hull.

Figure 14:
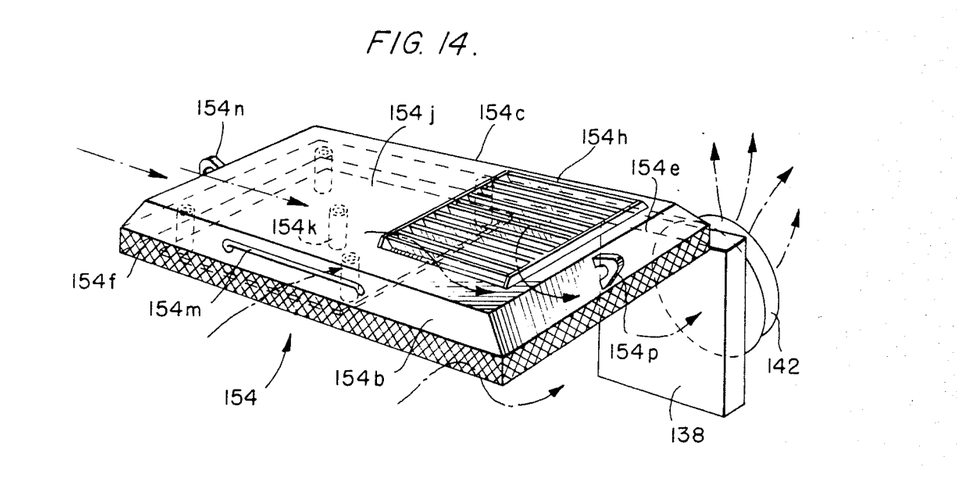
FIG. 14 is a perspective view of the engine cover member of the preferred embodiment of the present invention, illustrated in isolation for the sake of clarity.
Figure 15:
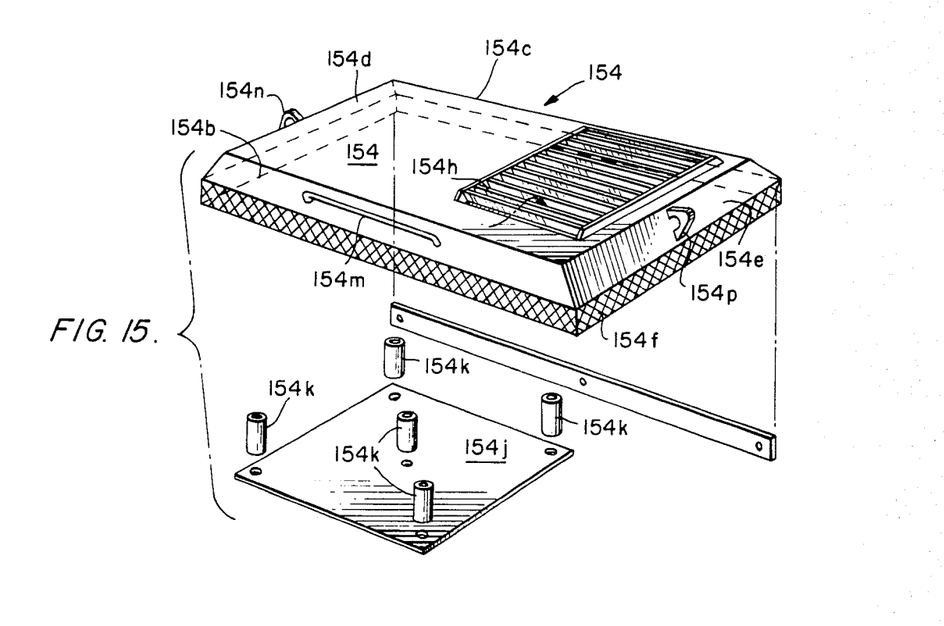
FIG. 15 is an exploded, perspective view of the cover member of FIG. 14.

Further details of cover member 154 as contemplated by the present invention are shown in FIGS. 14 and 15. Cover member 154 includes a top plate 154a, inclined side panels 154b and 154c welded to and depending therefrom, and an inclined front panel 154d and an inclined aft panel 154e both welded to and depending from top plate 154a. A wire mesh 154f is attached around three sides of cover member 154 to panels 154b, 154d and 154e. A plate 154g, as best shown in FIG. 15, is attached to panel 154c providing an obstruction so that air does not pass underneath plate 154a along the side of panel 154c. A louvered grate 154h is mounted in the aft section of plate 154a allowing air to flow down through the top plate into the vehicle. As shown in the drawings, the louvers are slanted so that the air flow is down and towards panel 154b. Attached to the underneath of the forward section of plate 154a is a deflector plate 154j. Deflector plate 154j is attached to top plate 154a by five spacer members 154k. These spacers provide a path for the air to flow between plate 154j and plate 154a but not passing underneath plate 154j and thereby scrubbing over the engine and transmission.

Cover member 154 is further provided with a handle 154m attached to plate 154b on one side thereof and suitable hinge assemblies on the opposing side whereby the cover member may be lifted providing access to the engine and transmission for servicing them. Tab members 154n and 154p attached to panels 154d and 154e respectively provide an attachment means to which hooks may be attached for lifting the cover member entirely off of the body so that the engine or the transmission can be installed or removed.

Whenever the cooling system of the vehicle is operated, air will be drawn through air inlet 149 and from the interior of the entire vehicle, through the radiator and plenum chamber and be expelled outwardly through exhaust opening 140 and baffle 141 into the atmosphere. As air is drawn from the interior of the vehicle, smoke and other noxious gases will be withdrawn from the personnel areas of the vehicle. In addition, a portion of such air flow will be drawn through air inlet 150 to feed the turbocharger of the engine. As the gases are diverted and caused to flow forwardly in the plenum chamber, they will have a cooling effect on the exhaust pipe and muffler located in the front end of the plenum chamber and will entrain exhaust gases from the engine which will be expelled into the atmosphere. Cover member plate 154g prevents the exhaust from reentering through air inlet 149.

The positioning of the exhaust outlet forwardly in the vehicle in lieu of the rear of the vehicle where it has been the conventional practice to locate the exhaust outlet, has the benefit of eliminating the possibility of the entry of water into the hull through the exhaust opening when the vehicle is departing from a body of water at a steep angle and the rear end of the vehicle is lowered to or below the water line. In addition, the positioning of the engine exhaust means in the plenum chamber where it is entrained with and cooled by the circulating air, has the benefit of providing a cooler exhaust which renders the vehicle less vulnerable to detection by heat sensing devices.

Referring to FIGS. 1 and 2, the driver's station 34 is disposed at the forward end of the vehicle between wheel well housings 51 and 52. The driver's station is provided with a driver's seat 155, a steering wheel assembly 156 forming a part of the steering system for the vehicle and a control console 157. Located next to the driver's seat is an assistant driver or companion seat 156. Seats 155 and 156 can be of any suitable type. Preferably, however, such seats should be vertically adjustable and should permit easy access and departure.

Steering assembly 156 includes a lower housing section 158 mounted on the hull adjacent wheel well housing 51, an upwardly projecting housing section 159 disposed laterally of the leg area of a driver seated in seat 155 and an upper, inwardly projecting housing section 160 extending across the legs of the driver. Lower housing section 159 contains a steering gear having a sector shaft 161 projecting through an opening in the hull. Depending from the sector shaft is a Pittman arm which is connected through a drag link to a steering arm on axle assembly 122, in the conventional manner. A steering shaft is disposed in intermediate housing section 59 and is operatively connected at its lower end to the steering gear in housing 158. The upper end of steering shaft is connected by a chain and sprocket assembly in upper housing 160 to a wheel shaft 162 journaled on an inner end of said upper housing section 160, in front of the driver's chair. A conventional steering wheel 163 is mounted on shaft 162 in easy reach of the driver seated on seat 155. It will be appreciated that upon turning steering wheel 163, the rotary motion is transmitted through the chain and sprocket assembly, the shaft in housing section 159, the steering gear in housing section 158 and sector shaft 161 to the components transmitting the steering motion from the sector shaft to axle assembly 22. In the conventional manner, axle assembly 22 is provided with a tie rod arrangement for transmitting steering motion from one wheel to the other, and a suitable power assist arrangement.

Control console 157 contains the various controls and instruments for the vehicle. The clutch control lever for operating disconnect clutch 61 is mounted on such console. In addition, the control levers for the engine and transmission are mounted on such console. All auxiliary electronical and hydraulic systems for the vehicle are controlled from appropriate levers, switches and buttons located on the console within easy reach of the driver.

Figures 11, 12, 13:
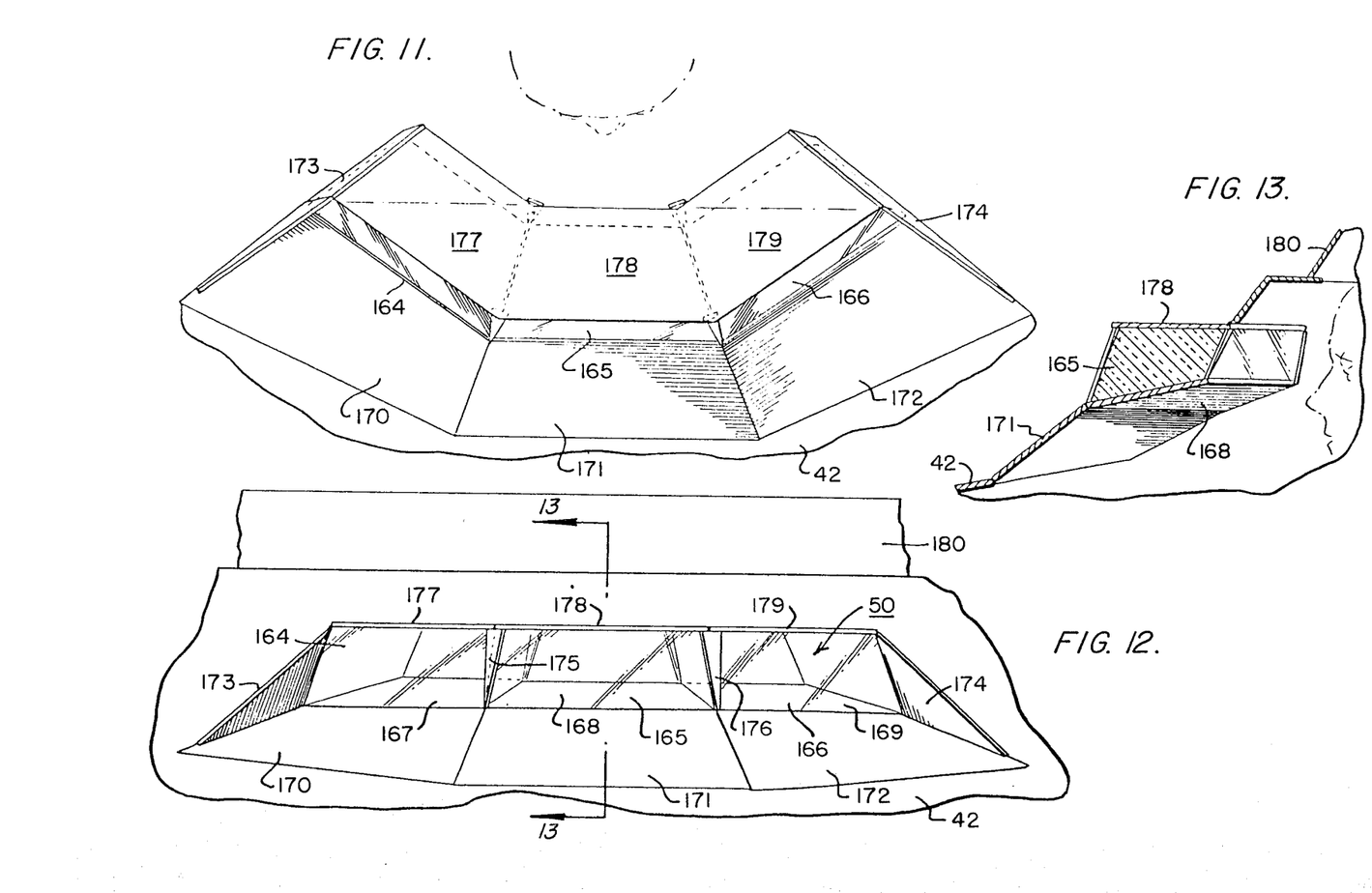
FIG. 11 is an enlarged cross-sectional view taken along line 11—11 in FIG. 1.
FIG. 12 is a front view of the arrangement shown in FIG. 11.
FIG. 13 is a cross-sectional view taken along line 13—13 in FIG. 12.

Vision block arrangement 50 mounted on the front wall or hood section 42 of the hull is best illustrated in FIGS. 11 through 13. Such arrangement consists of three vision blocks 164, 165 and 166 mounted in openings in the hood section in front of the driver's station. The vision blocks are mounted at substantially eye level with respect to an operator positioned on driver's seat 155 and are arranged arcuately relative to the head position of the operator. Each of the vision blocks is of a laminated glass construction and is provided with diverging upper and lower surfaces and diverging side surfaces so that by virtue of their arcuate arrangement, they provide a panoramic view for the driver of the vehicle. The vision blocks are supported on a raised portion of the hood section of the hull including upper flaring panels 167, 168 and 169 projecting forwardly and downwardly at a small angle to the horizontal, and a second set of flaring panels 170, 171 and 172 projecting forwardly and downwardly at a greater angle to the horizontal from the front edges of panels 167, 168 and 169. The sides of end vision blocks 167 and 169 abut a pair of side panels 173 and 174 which are secured along their lower edges to flaring panels 167 and 170, and flaring panels 169 and 172, respectively. The vision blocks are separted by partition panels 175 and 176 and are protected overhead by flaring panels 177, 178 and 179 which are secured to the upper edges of side panels 173 and 174, and partition panels 175 and 176.

As best illustrated in FIG. 1, the raised portion of hood section 42 on which the vision block arrangement is supported, is disposed above steering wheel 63. Such an arrangement is most advantageous to the driver in that it permits the driver's head to be located near the vision block arrangement, providing him with a panoramic view of the exterior while permitting easy access to the steering wheel and sufficient area above the wheel to operate the wheel without striking any portion of the hood section of the hull. The driver's seat preferably is adjustable vertically so that the driver can adjust his eye level with the level of the vision blocks. Furthermore, both the driver's seat and the companion's seat preferably can be adjusted upwardly sufficient to permit the head of the driver or companion to project through openings provided above the driver's station or the companion's station. Such openings above the driver's and companion's stations are provided with hatches 180 which may be opened and closed in any suitable manner.

In addition to the various systems of the vehicle as described, the vehicle may be provided with additional required and optional equipment and systems such as a fuel system, a winch system, operating batteries, a bilge pump, communications equipment, a lighting system, and the like. As previously indicated, the weapons station may be replaced with other forms of stations within the contemplation of the present invention.

During the operation of the vehicle as described, the driver is positioned on driver's seat 55 within easy reach of the steering wheel and the control console, and is provided with maximum visibility. When traversing rough terrain, he may operate the clutch control lever to engage the clutch and place the vehicle in a four-wheel drive mode. When traveling on level terrain or on roadways, the driver may simply operate the clutch control lever to disengage the clutch and place the vehicle in two-wheel drive. During amphibious operations, when it is desirable to utilize the propelling force of all the wheels, the clutch control lever is operated to place the vehicle in four-wheel drive.

It will be appreciated that by locating the engine in a vehicle as described, the engine load will be more uniformly distributed between the front and rear axle assemblies thus resulting in less component wear and breakdown, and greater stability of the vehicle during flotation. Furthermore, it will be noted that by positioning the engine as described with the transmission and drive transfer means being disposed rearwardly of the engine, maximum crew space is provided in the hull and the need for heavy, complex and costly transfer cases, as used in vehicles of the prior art, are eliminated. The elimination of a gear transfer case as used in comparable vehicles in the prior art and the positioning of the drive transfer means at the rear end of the vehicle also functions to reduce the noise level of the drive line arrangement and to locate such noise source to a position in the vehicle most remote from the crew compartment. It further will be appreciated that with the invention as described, the comfort of the crew will be improved by the removal of smoke and other noxious gases in the crew compartment and the general ventilation of the entire interior of the hull by the novel cooling system of the vehicle. The operation of the vehicle also is facilitated by the improved accessibility and visibility features of the vehicle as described. Finally, it will be noted that the simplicity of the drive line arrangement and the selection of components for the drive line will result in a reduced manufacturing cost of the vehicle.

From the foregoing detailed description, it will be evident that there are a number of changes, adaptations and modifications of the present invention which come within the province of those skilled in the art. However, it is intended that all such variations not departing from the spirit of the invention be considered as within the scope thereof and is limited solely by the appended claims.

I claim:

1. In a vehicle having a body of monocoque construction and an engine mounted in said body, a cooling system comprising:
   a means disposed on said body defining a plenum chamber disposed between said engine and a side wall of said vehicle body,
   an exhaust means associated with said plenum chamber,
   a radiator disposed between an interior portion of said body including said engine and said plenum chamber, mounted substantially in a rear corner of said body, and operatively connected to said engine,
   a fan mounted in said plenum chamber between said radiator and said exhaust means and adjacent said radiator,
   a driving means for driving said fan, whereby upon operation of said fan air within the interior portion of said body including said engine is drawn through said radiator and said plenum chamber and expelled through said exhaust means,
   an access means on said body positioned generally over said engine for providing access to said engine from outside said body,
   an air inlet means associated with said access means for providing air from outside said body to said radiator, and
   a directing means associated with said access means for directing air provided by said air inlet means to said radiator so that the incoming ambient air does not scrub over said engine.

2. A cooling system according to claim 1 further comprising:
   an engine exhaust means disposed in said plenum chamber exhaust means.

3. A cooling system according to claim 1 wherein:
   said air inlet means is disposed on a top wall of said body, at least partially above said engine.

4. A cooling system according to claim 1 wherein:
   said fan is driven by a fluid motor disposed in said plenum chamber and operated by a pump driven by said engine.

5. A cooling system according to claim 1 wherein:
   said exhaust means is mounted forwardly of said radiator whereby air drawn through said radiator from said vehicle interior will be caused to flow forwardly through said plenum chamber and be expelled through said exhaust means.

6. A cooling system according to claim 1 wherein:
   said exhaust means includes means for diverting exhaust gases laterally and outwardly.

7. A cooling system according to claim 1 wherein:
   said plenum chamber is defined by a portion of said vehicle body, an interior side wall disposed between said engine and said vehicle body, a front wall disposed between said interior plenum side wall and said vehicle body and said radiator disposed between said interior plenum side wall and said vehicle body.

8. A cooling system according to claim 7 wherein:
said radiator is disposed in substantially longitudinal alignment with said interior plenum side wall.

9. A cooling system according to claim 1 further comprising:
a turbocharger assembly operatively connected to said engine having an air inlet opening into the interior of said body.

10. A cooling system according to claim 2 further comprising:
an entraining means for entraining the exhaust from said engine exhaust means with the exhaust from said plenum chamber exhaust means prior to expelling into the atmosphere.

11. A cooling system according to claim 10 wherein:
said vehicle includes two or more axle assemblies and the outlet of said exhaust means is disposed above the rearmost of said axle assemblies.

12. A cooling system according to claim 1 wherein:
said access means includes a hood member removably disposed over an opening in a top wall of said body, and
said air inlet means includes spacing means for spacing said hood member a distance from said body whereby air may flow through said opening into said body.

13. A cooling system according to claim 12 wherein:
said directing means includes a blocking means associated with said hood member positioned over the portion of said opening directly above said engine for blocking the flow of air through said opening away from said engine.

14. A cooling system according to claim 13 wherein:
said blocking means comprises a cover member connected to and spacedly depending from said hood member, the space between said cover member and said hood member defining at least a portion of said air inlet means.

15. A cooling system according to claim 12 wherein:
said spacing means includes a mesh means connected to said hood member and positionable against said body.

16. A cooling system according to claim 12 further comprising:
an exhaust blocking means for blocking air exhausted from said exhaust means from directly entering said air inlet means,
said exhaust means includes diverting means for diverting exhaust gases laterally and outwardly, and
said exhaust blocking means is attached to said hood member on the side of said hood member adjacent said diverting means.

17. A cooling system according to claim 1 further comprising:
an exhaust blocking means for blocking air exhausted from said exhaust means from directly entering said air inlet means.

18. A cooling system according to claim 12 wherein:
said air inlet means further includes a grate mounted on a top plate of said hood member whereby air may pass downwardly through said hood member.

19. A cooling system according to claim 18 wherein:
said grate is mounted to an aft portion of said hood member.

20. A cooling system according to claim 12 further comprising:
a handle attached to one side of said hood member, and
a hinging means for hinging the side of said hood member opposite said one side to said body.

21. A cooling system according to claim 12 further comprising:
a pair of lifting eyes attached to opposite sides of said hood member.

22. A cooling system according to claim 1 including,
an operator's station disposed in said body, and
said driving means driving said fan so that air is drawn from said operator's station through said radiator and said plenum chamber and expelled through said exhaust means.

23. In a vehicle having a body of monocoque construction and an engine mounted in said body, a cooling system comprising:
a means disposed on said body defining a plenum chamber,
an exhaust means associated with said plenum chamber,
a radiator disposed between an interior portion of said body including said engine and said plenum chamber and operatively connected to said engine,
a fan mounted in said plenum chamber between said radiator and said exhaust means and adjacent said radiator,
a driving means for driving said fan, whereby upon operation of said fan air within the interior portion of said body including said engine is drawn through said radiator and said plenum chamber and expelled through said exhaust means,
an access means on said body positioned generally over said engine for providing access to said engine from outside said body,
an air inlet means associated with said access means for providing air from outside said body to said radiator,
a directing means associated with said access means for directing air provided by said air inlet means to said radiator so that the incoming ambient air does not scrub over said engine,
said access means including a hood member removably disposed over an opening in a top wall of said body,
said air inlet means including a spacing means for spacing said hood member a distance from said body whereby air may flow through said opening into said body,
said directing means including a blocking means associated with said hood member positioned over the portion of said opening directly above said engine for blocking the flow of air through said opening away from said engine, and
said blocking means comprising a cover member connected to and spacedly depending from said hood member, the space between said cover member and said hood member defining at least a portion of said air inlet means.

24. A cooling system according to claim 23 wherein:
said spacing means includes a mesh means connected to said hood member and positionable against said body.

25. A cooling system according to claim 23 further comprising:
an exhaust blocking means for blocking air exhausted from said exhaust means from directly entering said air inlet means.

26. A cooling system according to claim 23 further comprising:
a handle attached to one side of said hood member, and
a hinging means for hinging the side of said hood member opposite said one side to said body.

27. A cooling system according to claim 23 further comprising:
a pair of lifting eyes attached to opposite sides of said hood member.

28. A cooling system according to claim 23 further comprising:
an operator's station disposed in said body, and
said driving means driving said fan so that air is drawn from said operator's station through said radiator and said plenum chamber and expelled through said exhaust means.

29. In a vehicle having a body of monocoque construction and an engine mounted in said body, a cooling system comprising:
a means disposed on said body defining a plenum chamber,
an exhaust means associated with said plenum chamber,
a radiator disposed between an interior portion of said body including said engine and said plenum chamber and operatively connected to said engine,
a fan mounted in said plenum chamber between said radiator and said exhaust means and adjacent said radiator,
a driving means for driving said fan, whereby upon operation of said fan air within the interior portion of said body including said engine is drawn through said radiator and said plenum chamber and expelled through said exhaust means,
an access means on said body positioned generally over said engine for providing access to said engine from outside said body,
an air inlet means associated with said access means for providing air from outside said body to said radiator,
a directing means associated with said access means for directing air provided by said air inlet means to said radiator so that the incoming ambient air does not scrub over said engine,
said access means including a hood member removably disposed over an opening in a top wall of said body, and
said air inlet means including a spacing means for spacing said hood member a distance from said body whereby air may flow through said opening into said body, and
a grate mounted on a top plate of said hood member whereby air may pass downwardly through said hood member.

30. A cooling system according to claim 29 wherein:
said grate is mounted to an aft portion of said hood member.

31. A cooling system according to claim 29 further comprising:
a handle attached to one side of said hood member, and
a hinging means for hinging the side of said hood member opposite said one side to said body.

32. A cooling system according to claim 29 further comprising:
a pair of lifting eyes attached to opposite sides of said hood member.

33. A cooling system according to claim 29 further comprising:
an operator's station disposed in said body, and
said driving means driving said fan so that air is drawn from said operator's station through said radiator and said plenum chamber and expelled through said exhaust means.

34. In a vehicle having a body of monocoque construction and an engine mounted in said body, a cooling system comprising:
a means disposed on said body defining a plenum chamber,
an exhaust means associated with said plenum chamber,
a radiator disposed between an interior portion of said body including said engine and said plenum chamber and operatively connected to said engine,
a fan mounted in said plenum chamber between said radiator and said exhaust means and adjacent said radiator,
a driving means for driving said fan, whereby upon operation of said fan air within the interior portion of said body including said engine is drawn through said radiator and said plenum chamber and expelled through said exhaust means,
an access means on said body positioned generally over said engine for providing access to said engine from outside said body,
an air inlet means associated with said access means for providing air from outside said body to said radiator,
a directing means associated with said access means for directing air provided by said air inlet means to said radiator so that the incoming ambient air does not scrub over said engine,
said access means including a hood member removably disposed over an opening in a top wall of said body,
said air inlet means including a spacing means for spacing said hood member a distance from said body whereby air may flow through said opening into said body,
an exhaust blocking means for blocking air exhausted from said exhaust means from directly entering said air inlet means,
said exhaust means including a diverting means for diverting exhaust gases laterally and outwardly, and
said exhaust blocking means is attached to said hood member on the side of said hood member adjacent said diverting means.

35. A cooling system according to claim 34 further comprising:
an operator's station disposed in said body, and
said driving means driving said fan so that air is drawn from said operator's station through said radiator and said plenum chamber and expelled through said exhaust means.

* * * * *